(12) United States Patent
Stuve

(10) Patent No.: US 7,312,679 B2
(45) Date of Patent: Dec. 25, 2007

(54) MAGNETOSTRICTIVE STRESS WAVE SENSOR

(75) Inventor: Steven R. Stuve, Lake Mills, WI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/490,324

(22) Filed: Jul. 20, 2006

(65) Prior Publication Data

US 2006/0261917 A1 Nov. 23, 2006

Related U.S. Application Data

(62) Division of application No. 10/792,739, filed on Mar. 5, 2004, now Pat. No. 7,081,801.

(51) Int. Cl.
*H01F 7/00* (2006.01)

(52) U.S. Cl. ..................... 335/215; 73/862.69

(58) Field of Classification Search ............... 335/215, 335/205–207; 340/436; 73/862.333, 862.69; 310/26

See application file for complete search history.

(56) References Cited

U.S. PATENT DOCUMENTS

| | | | |
|---|---|---|---|
| 3,945,459 | A | 3/1976 | Oishi et al. |
| 4,284,863 | A | 8/1981 | Breed |
| 4,308,474 | A | 12/1981 | Savage et al. |
| 4,342,228 | A | 8/1982 | Savage |
| 5,275,049 | A | 1/1994 | Schiessle et al. |
| 5,580,084 | A | 12/1996 | Gioutsos |
| 5,767,766 | A | 6/1998 | Kwun |
| 5,983,724 | A | 11/1999 | Yoshida |
| 6,037,682 | A | 3/2000 | Shoop et al. |
| 6,329,910 | B1 | 12/2001 | Farrington |
| 6,389,911 | B1 | 5/2002 | Aoki |
| 6,587,048 | B1 | 7/2003 | Bomya |

OTHER PUBLICATIONS

"Back in Style: Magnetostrictive Sensors", by Dr. Hegeon Kwun, Technology Today, Sep. 1991, 9pp.
"Better Sonar Driven by New Transducer Materials", by Charlie Bright, ST Sonar Feature, 4pp.
"Terfenol Basics", web page printout, http://www.terfenoltruth.com/basics/, Oct. 13, 2003, 1p.
"Vehicle Crash Testing using the LogBook/300", Application Note #38, Iotech, Inc. 3pp.
"RDP Electronics & MTS Temposonics Transducers Principle of Operation", RDP Group, website printout, www.rdpelectronics.com/displacement/magneto/principle.htm, May 1, 2002, 1p.
"Terfenol-D Sensor Design and Optimization", by Frederick T. Calkins and Alison B. Flatua, Aerospace Engineering and Engineering Mechanics Dept., Iowa State University, Ames, IA 50011, 10pp.
Sensor Technology Review MsS Overview: Diagram, 1p.

*Primary Examiner*—Ramon M. Barrera
(74) *Attorney, Agent, or Firm*—Lonnie Drayer

(57) ABSTRACT

A shock sensor has a housing with a Terfenol-D type sensing element positioned inside a sensing coil. A permanent biasing magnet is positioned in engagement with the Terfenol-D sensing element, and a spacer engages the Terfenol-D sensing element and extends from the housing. The housing has a beam with one or two mounting holes through which fasteners extend to mount the shock sensor to a structural member. The housing places the spacer in compression against the structural member. In an alternative embodiment a DC current can be supplied to the sensing coil to provide the biasing magnetic field. A high frequency filter separates the shock sensing signal from the applied DC biasing current.

11 Claims, 3 Drawing Sheets

MAGNETOSTRICTIVE STRESS WAVE SENSOR

This is a Divisional of U.S. patent application Ser. No. 10/792,739 filed Mar. 05, 2004 now U.S. Pat. No. 7,081,801.

FIELD OF THE INVENTION

The present invention relates to shock sensors for monitoring vehicle crashes in general, and to shock sensors utilizing the magnetostrictive effect in particular.

BACKGROUND OF THE INVENTION

The modern automobile is equipped with many active safety systems, from seat belt tensioners, to air bags and fuel cutoff valves. To properly trigger the activation of the various active safety systems, crash sensors are used to detect the onset of a crash and to determine the severity of a crash. To optimize the use of active safety systems it is important to know as soon as possible the likely severity of the crash. Better results can be achieved by early detection of crash severity and early deployment of active safety systems. At the same time, considerable cost can be saved if safety systems are not deployed in less severe crashes where passive restraints such a seat belts are likely to be sufficient to prevent serious injury. As automobiles employ larger numbers of air bags and other deployable safety systems, the cost of replacing deployed safety systems becomes a considerable portion of the cost of repairs following a crash. Of course, in a severe crash, when deployment of all safety systems is desired, the automobile may have little residual value due to the extensive damage caused by the crash. This tension between the benefits of early deployment versus the cost of unnecessary deployment focuses attention on sensors that can give an indication of crash severity early in a crash. One type of known shock sensor that employs the inverse magnetostrictive effect or the Villari effect, can detect shock waves in ferrous structural members. Shock waves can be signal processed to give an indicator of crash severity early in the crash sequence. However, the ability to detect shock waves in non-ferrous structural members, and a sensor having a larger output voltage are desirable to increase the utility of sensors that detect shock waves in structural members an automobile during a crash.

SUMMARY OF THE INVENTION

The shock sensor of this invention employs a Terfenol-D sensing element positioned inside a sensing coil. A permanent biasing magnet is positioned in engagement with the Terfenol-D sensing element, and a spacer engages the Terfenol-D sensing element and extends from a housing that surrounds the biasing magnet, the Terfenol-D sensing element, and the sensing coil. The housing has a beam with two spaced-apart mounting holes through which fasteners extend to mount the shock sensor to a vehicle structural member. The mounting of the beam places the spacer in compression against the vehicle structural member. The spacer, the Terfenol-D sensing element, and the biasing magnet are packaged in a sleeve that is positioned in a cylindrical portion of the beam that extends perpendicular to the beam. The beam is mounted by the fasteners to the vehicle structural member. A bobbin about which the sensing coil is wound is positioned over the Terfenol-D sensing element and the biasing magnet, and the bobbin is over-molded to the beam. Compressive waves introduced in the vehicle structural member to which the shock sensor is mounted travel through the spacer which is held in engagement with the structural member, and from the spacer to the Terfenol-D sensing element. The strain in the Terfenol-D sensing element under the influence of the magnetic field of the biasing magnet, produces a substantial change in magnetic field strength that results in the generation of voltage in the output leads of the coil.

In the preferred embodiment the sensor is passive and has a large voltage output that is easily detected and digitized. In an alternative embodiment, a DC current can be supplied to the sensing coil to provide the biasing magnetic field. The voltage produced by shock traveling through the Terfenol-D sensing element can be detected by a high frequency filter that separates the shock sensing signal from the applied DC biasing current. A simple series-connected capacitor in the sensing output of the shock sensor can function as the high frequency filter.

It is a feature of the present invention to provide a shock sensor that detects shock waves in the structural elements of a vehicle.

It is another feature of the present invention to provide a shock sensor that detects shock waves in the nonferrous structural elements of a vehicle.

It is a further feature of the present invention to provide a shock sensor for early detection of crash severity.

Further features and advantages of the invention will be apparent from the following detailed description when taken in conjunction with the accompanying drawings.

DETAILED DESCRIPTION OF THE INVENTION

Figure 1:
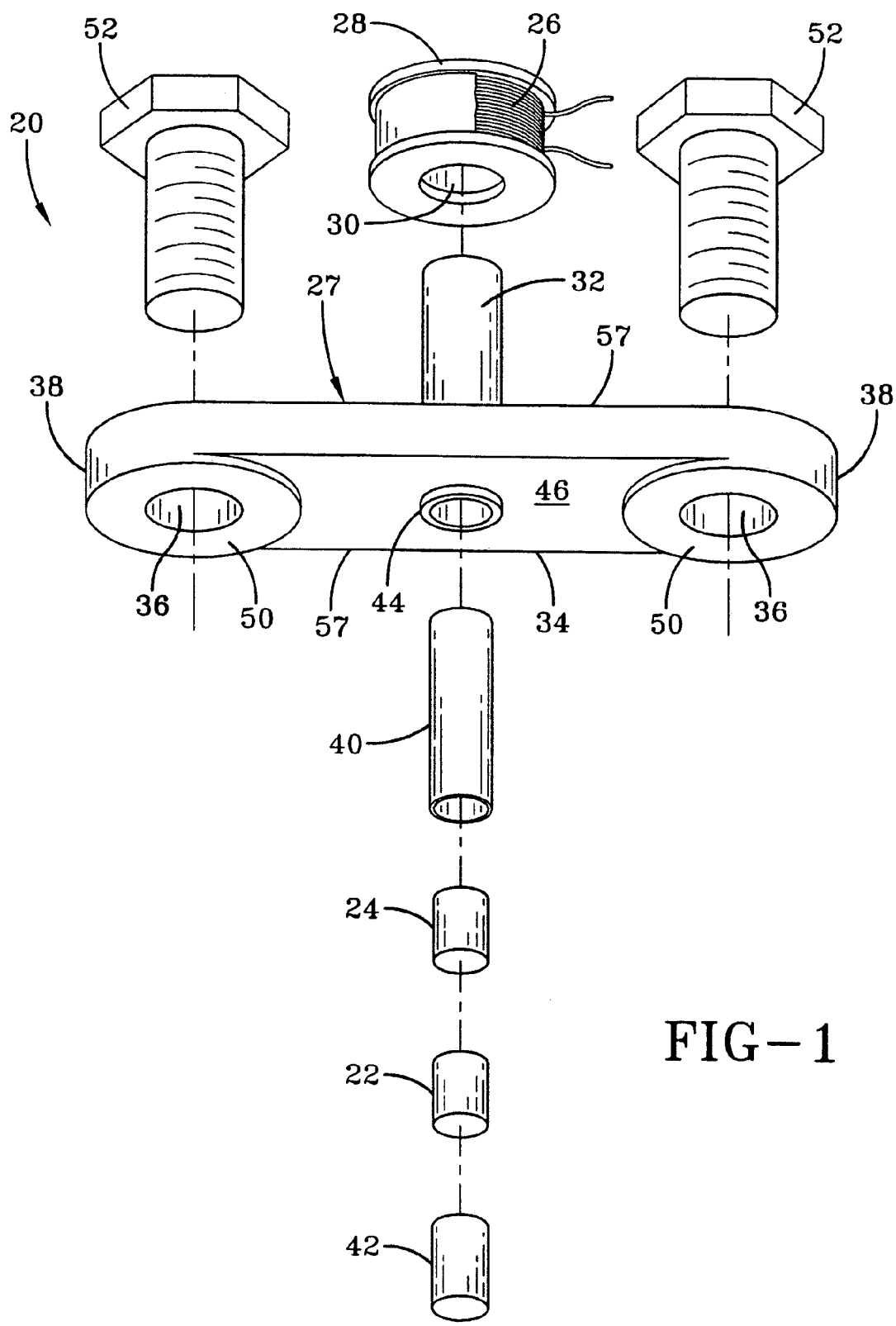
FIG. 1 is an exploded isometric view of the crash sensor of this invention.
Figure 2:
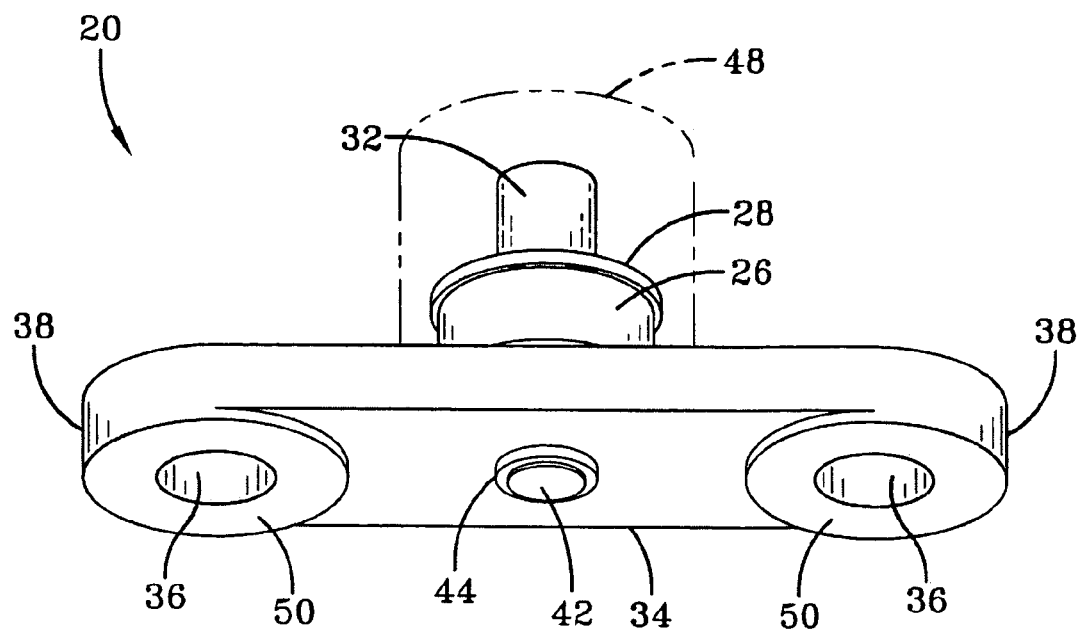
FIG. 2 is an isometric view of the crash sensor of FIG. 1 with the over-molding of the coil shown in phantom view.

Referring to FIGS. 1-4, wherein like numbers refer to similar parts, a crash sensor 20 is shown in FIG. 2. The crash sensor 20, as shown in FIG. 1, has three functional elements: a Terfenol-D (Tb0.3 Dy0.7 Fe1.92) sensing element 22, a biasing magnet 24, and a sensing coil 26 mounted on a housing 27. The housing 27 has a cylindrical portion 32 that projects from a beam 34. The shock sensor 20 incorporates a bobbin 28 on which the sensing coil 26 is wound. The bobbin 28 has a central aperture 30 that fits over the cylindrical housing portion 32. The sensing coil 26 can have for example, around 1,000 turns of thirty-six gauge wire. The beam 34 extends on either side of the cylindrical housing portion 32 and has two apertures 36, one formed in each end 38 of the beam. As shown in FIG. 1, a sleeve 40 is loaded with a cylindrical biasing magnet 24, a cylindrical Terfenol-D sensing element 22 and a cylindrical spacing element 42 that protrudes from the sleeve 40. The biasing magnet 24, the Terfenol-D sensing element 22 and the cylindrical spacing element 42 can be press fit or bonded to the sleeve 40. The sleeve 40 is positioned within the cylindrical housing 32 so that the spacing element 42 protrudes beyond a land 44, on the bottom surface 46 of the beam 34. The sleeve 40 can be press fit or bonded within the cylindrical housing 32. The bobbin 28 about which the sensing coil 26 is wound is surrounded by an over molded enclosure 48, as shown in FIG. 2.

Figure 4:
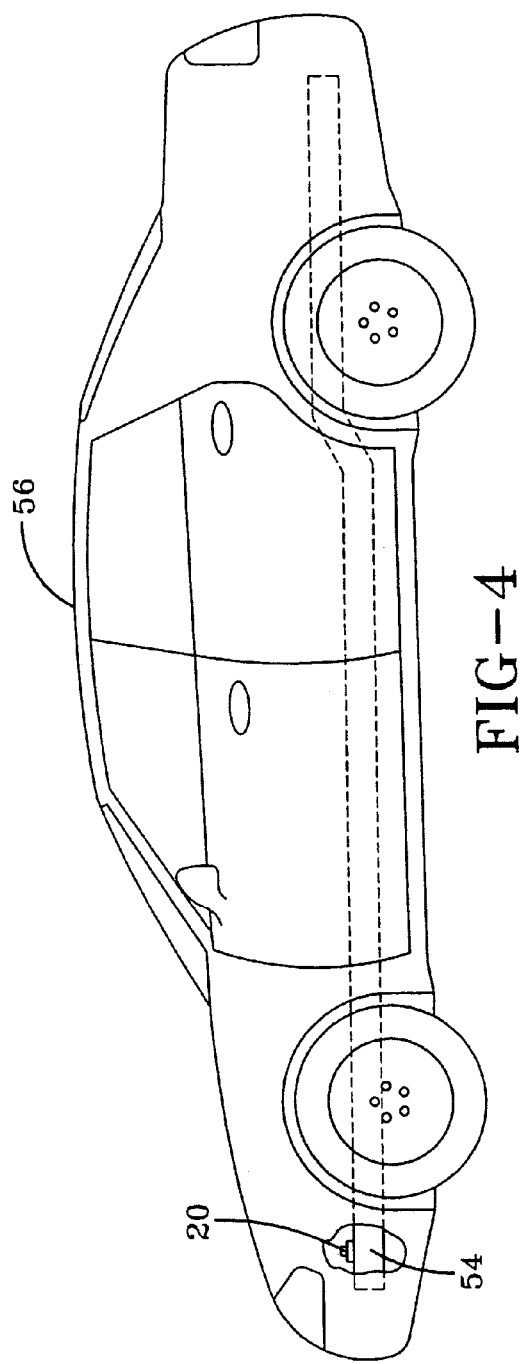
FIG. 4 is a side elevation, somewhat schematic view, of an automobile cut away to show the mounting of the crash sensor of FIG. 1.

End bosses or lands 50 surround the apertures 36 and define a mounting plane. Fasteners 52 extend through the end apertures 36 of the beam 34 and mount the crash sensor 20 to a structural element 54 of an automobile 56, as shown in FIG. 4. The cylindrical spacing element 42 extends beyond the mounting plane so that when the end bosses 50 are brought into contact with a portion of a structural element 54, the spacing element 42 is resiliently compressed by the flexure of portions 57 of the housing 27 between the fasteners 52 and the Terfenol-D sensing element. This resilient flexure of housing portions 57 in turn compresses the Terfenol-D sensing element against the structural element 54 of the automobile 56. This compressive loading assures good transmission of shock waves from the structural element 54 to the Terfenol-D sensing element 22. To improve the transmission of shock from the spacing element 42 to the Terfenol-D, the spacing element 42 is preferably bonded with an adhesive to the sensing element.

The output from the coil may be from about 0.2 to 2.0 volts or greater, depending on the number of turns in the sensing coil 26, the biasing field of the biasing magnet 24, the composition of the structural member to which the crash sensor 20 is mounted, the force of the pre-load on the spacing element 42 and other factors affecting coupling between the Terfenol-D sensing element 22 and the structural material to which the crash sensor 20 is mounted.

Figure 3:
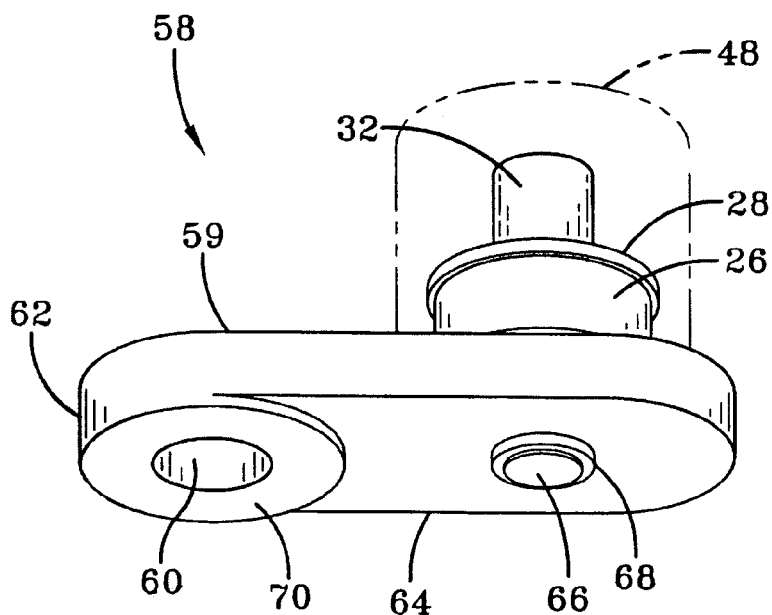
FIG. 3 is an alternative embodiment of the crash sensor of this invention.

An alternative embodiment shock sensor 58 is shown in FIG. 3. The shock sensor 58 is similar to the shock sensor 20, but has only one mounting aperture 60 in an end 62 of a cantilever beam 64, rather than the two apertures 36 on the opposite ends of the beam 34 of the shock sensor 20. The shock sensor 58 has a housing 59 with a cantilever beam 64 that forms a biasing member that resiliently compresses the sensing element by way of a spacing element 66 against the structural element 54 of the automobile 56. The spacing element 66, as in the device 20, engages a biasing magnet that extends within the sensing coil 26 formed on a bobbin.

The shock sensor 58 housing has a boss 68 that surrounds the opening into which the spacing element 66 is fitted. A mounting boss 70 projects from the housing around a mounting aperture 60, and a mounting plane is defined by the mounting boss 70. The spacing element 66 extends from the housing beyond the mounting plane. Flexure of the cantilever beam 64 caused by the spacing element 66 extending beyond the mounting plane causes the compressive loading between the spacing element 66 and the structural element 54 of the automobile 56.

It should be understood that the spacing element 42 could be omitted and the Terfenol-D sensing element extended to engage the automobile structural element 54. A second biasing magnet could also be used between the spacing element 42 and the Terfenol-D sensing element 22, or instead of the spacing element 42 to increase the strength of the biasing magnetic field. The magnet will preferably be of a high-strength type such as those fabricated with a rare earth metal, for example neodymium-iron-boron magnets.

Figure 5:
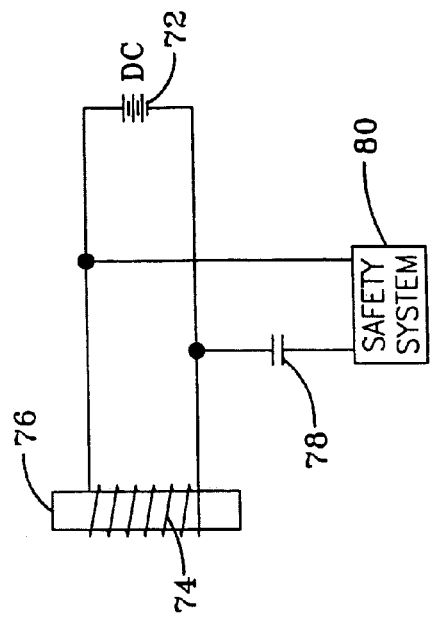
FIG. 5 is a circuit diagram a further alternative embodiment of the crash sensor of this invention.

The biasing magnet 24 can be replaced with a DC voltage 72 as shown in FIG. 5 which is applied to the sensing coil 74 that contains a Terfenol-D sensing element 76. The output of the coil 74 may be applied to a high frequency filter such as formed by capacitor 78. The high frequency filter separates the voltage produced by the shock wave passing through the Terfenol-D sensing element from the supplied DC biasing voltage 72. The output of the high frequency filter can be supplied to a safety system 80 or other processing circuit for characterizing an automobile crash Terfenol-D is an alloy of Tb0.3 Dy0.7 Fe1.92 but the term giant magnetostrictive material is defined to include Terfenol-D and various alloys of highly magnetostrictive rare earths such as Tb and Dy, as claimed in U.S. Pat. No. 4,308,474 which is incorporated herein by reference. A sensing assembly is defined which include the sensing element 22 alone or the sensing element plus the spacing element 42.

It is understood that the invention is not limited to the particular construction and arrangement of parts herein illustrated and described, but embraces all such modified forms thereof as come within the scope of the following claims.

I claim:

1. A shock wave sensor in a motor vehicle comprising:
a housing, the housing having a portion defining a mounting aperture;
a portion of the housing defining a cavity spaced from the mounting aperture;
a portion of the housing defining a beam extending between the mounting aperture and the cavity;
a biasing magnet mounted to the housing in the cavity;
a sensing assembly having a giant magnetostrictive sensing element therein, the sensing assembly mounted within the cavity and having portions that extend from the housing;
a coil mounted to the housing and surrounding the cavity and the giant magnetostrictive sensing element therein, the coil for sensing a change in a magnetic field produced by a shock wave in the giant magnetostrictive sensing element;
a portion of the housing providing a mounting surface;
a fastener extending through the mounting aperture to hold the mounting surface of the housing against a structure, wherein the sensing assembly is loaded against a structure of the motor vehicle when the portion of the housing providing a mounting surface is held by the fastener against the structure; and
a portion of the housing that extends between the mounting surface and sensing assembly, that resiliently biases the sensing assembly against the structure thereby compressively loading the giant magnetostrictive sensing element against the structure or an optional spacer in engagement with and located between the giant magnetostrictive sensing element and the structure to improve shock wave transmission to the sensing element.

2. The shock wave sensor of claim 1 wherein the sensing assembly comprises a giant magnetostrictive sensing element and a spacer, and wherein the portions of the sensing element which extend from the housing are defined by the spacer.

3. The shock wave sensor of claim 2 wherein the biasing magnet is in direct contact with the giant magnetostrictive sensing element and the giant magnetostrictive sensing element is bonded to the spacer.

4. The shock wave sensor of claim 1 wherein the giant magnetostrictive sensing element comprises Terfenol-D.

5. The shock wave sensor of claim 1 wherein the biasing magnet is a high-strength type containing a rare earth metal.

6. The shock wave sensor of claim 1 further comprising a second biasing magnet between the spacing element and the giant magnetostrictive element.

7. The shock wave sensor of claim 1 wherein the spacer is a second biasing magnet.

8. The shock wave sensor of claim 1 wherein each of the magnetostrictive sensing elements, the biasing magnet and the spacer are cylindrical.

9. The shock wave sensor of claim 8 further comprises a cylindrical sleeve, having the cylindrical biasing magnet, the cylindrical giant magnetostrictive sensing element and the cylindrical spacing element loaded therein and wherein the spacing element protrudes from the sleeve and the sleeve is press fit or bonded within a cylindrical portion of the housing.

10. The shock wave sensor of claim 8 wherein the giant magnetostrictive sensing element, the biasing magnet and the spacer are press fit or bonded to the sleeve.

11. The shock wave sensor of claim 8 wherein the giant magnetostrictive sensing element has one of either the biasing magnet or the spacer bonded to the giant magnetostrictive sensing element at each end.

\* \* \* \* \*